(12) United States Patent
Mayell

(10) Patent No.: US 8,441,815 B2
(45) Date of Patent: *May 14, 2013

(54) ASYMMETRIC SWITCH FORWARD CONVERTER

(75) Inventor: Robert J. Mayell, San Francisco, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,882

(22) Filed: Apr. 5, 2012

(65) Prior Publication Data

US 2012/0188800 A1    Jul. 26, 2012

Related U.S. Application Data

(63) Continuation of application No. 12/192,810, filed on Aug. 15, 2008, now Pat. No. 8,174,852.

(51) Int. Cl.
*H02M 3/335* (2006.01)

(52) U.S. Cl.
USPC ............. 363/21.12; 363/18; 363/20; 363/65

(58) Field of Classification Search .......... 363/16, 363/17, 18, 20, 21.01, 21.02, 21.04, 21.12, 363/65, 25, 56.02, 58, 98, 132
See application file for complete search history.

(56) References Cited

U.S. PATENT DOCUMENTS

| | | |
|---|---|---|
| 5,847,941 A | 12/1998 | Taguchi et al. |
| 5,875,103 A | 2/1999 | Bhagwat et al. |
| 5,986,904 A | 11/1999 | Jacobs et al. |
| 6,191,960 B1 | 2/2001 | Fraidlin et al. |
| 6,252,782 B1 * | 6/2001 | Akashi et al. .................. 363/17 |
| 6,466,459 B1 * | 10/2002 | Guerrera ......................... 363/17 |
| 6,469,915 B2 | 10/2002 | Huang et al. |

(Continued)

FOREIGN PATENT DOCUMENTS

| | | |
|---|---|---|
| EP | 0443155 A1 | 8/1991 |
| GB | 2079014 A | 1/1982 |

(Continued)

OTHER PUBLICATIONS

EP 08163505—European Search Report, dated Feb. 24, 2009 (5 pages).

(Continued)

*Primary Examiner* — Nguyen Tran
(74) *Attorney, Agent, or Firm* — Blakely Sokoloff Taylor & Zafman LLP

(57) ABSTRACT

A switching circuit for use in a power supply includes a first active switch coupled to a first terminal of a primary winding of a transformer. A second active switch is coupled to a second terminal of the primary winding of the transformer. An output capacitance of the first active switch is greater than an output capacitance of the second active switch. A first passive switch is coupled to the second active switch and to the second terminal of the primary winding. A second passive switch is coupled to the first active switch and to the first terminal of the primary winding. A reverse recovery time of the first passive switch is greater than a reverse recovery time of the second passive switch. A recovery circuit is coupled to receive a current from the first passive switch.

7 Claims, 7 Drawing Sheets

U.S. PATENT DOCUMENTS

| | | | |
|---|---|---|---|
| 6,483,724 B1 * | 11/2002 | Blair et al. | 363/17 |
| 6,496,392 B2 | 12/2002 | Odell | |
| 6,639,814 B2 | 10/2003 | Gan et al. | |
| 6,687,141 B2 | 2/2004 | Odell | |
| 6,813,171 B2 | 11/2004 | Odell | |
| 7,218,081 B2 | 5/2007 | Jang et al. | |
| 7,606,051 B1 | 10/2009 | Wittenbreder | |
| 2007/0025125 A1 * | 2/2007 | Nakahori et al. | 363/56.02 |
| 2009/0097279 A1 | 4/2009 | Zhang et al. | |

FOREIGN PATENT DOCUMENTS

| | | |
|---|---|---|
| JP | 02-311171 A | 12/1990 |
| TW | 200605480 | 2/2006 |
| WO | WO 02/060066 A1 | 8/2002 |

OTHER PUBLICATIONS

CN 2009-10163382.9—First Chinese Office Action, issued Nov. 5, 2012, with English Translation (10 pages).

* cited by examiner $I_T = -I_M$
$I_P = 0$
$V_P = 0$

US 8,441,815 B2

ASYMMETRIC SWITCH FORWARD CONVERTER

CROSS-REFERENCE TO RELATED APPLICATION

This application is a continuation of U.S. patent application Ser. No. 12/192,810, filed Aug. 15, 2008, now pending. U.S. patent application Ser. No. 12/192,810 is hereby incorporated by reference.

BACKGROUND INFORMATION

1. Field of the Disclosure

The present invention relates generally to power supplies and, more particularly, the present invention relates to forward converters.

2. Background

AC-to-DC and DC-to-DC power supplies typically use a power conversion topology commonly known as a two-switch forward converter (that is, a forward converter having two active switches).

The two-switch forward converter typically uses two active switches and two passive switches in a configuration that applies an input voltage to the primary winding of a transformer. A secondary winding on the transformer produces a scaled voltage in response to the input voltage applied to the primary winding. The voltage on the secondary winding is rectified and filtered to generate an output voltage. The passive switches allow the magnetizing energy of the transformer to reset when the active switches are off. The magnetizing energy of the transformer is allowed to reset (that is, return to a much lower value) to prevent excess stored energy from saturating the transformer and thereby altering its properties.

The two-switch forward converter is often the lowest cost configuration that meets the requirements of power supplies for personal computers and similar applications. The symmetry of the circuit topology of the two-switch forward converter invites designers to choose nominally identical transistors for the two active switches and to choose nominally identical diodes for the two passive switches.

Conventional designs of two-switch forward converters specify either the same component or two different components with nearly identical properties for the two transistors, and likewise for the two diodes. Such designs fail to take advantage of an additional degree of freedom that can reduce system cost.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing a switching circuit for reducing the energy dissipation of a power converter having unmatched switches are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

An asymmetric switch forward converter will now be described. Examples of the present invention involve a first and second active switch and a first and second passive switch. The first active switch can be coupled to a first terminal of a primary winding of a transformer. The second active switch can be coupled to a second terminal of the primary winding of the transformer. The output capacitance of the first active switch is substantially greater than the output capacitance of the second active switch. The first passive switch can be coupled to the second active switch and to the second terminal of the primary winding. The second passive switch can be coupled to the first active switch and to the first terminal of the primary winding. The reverse recovery time of the first passive switch is substantially greater than the reverse recovery time of the second passive switch.

Figure 1:
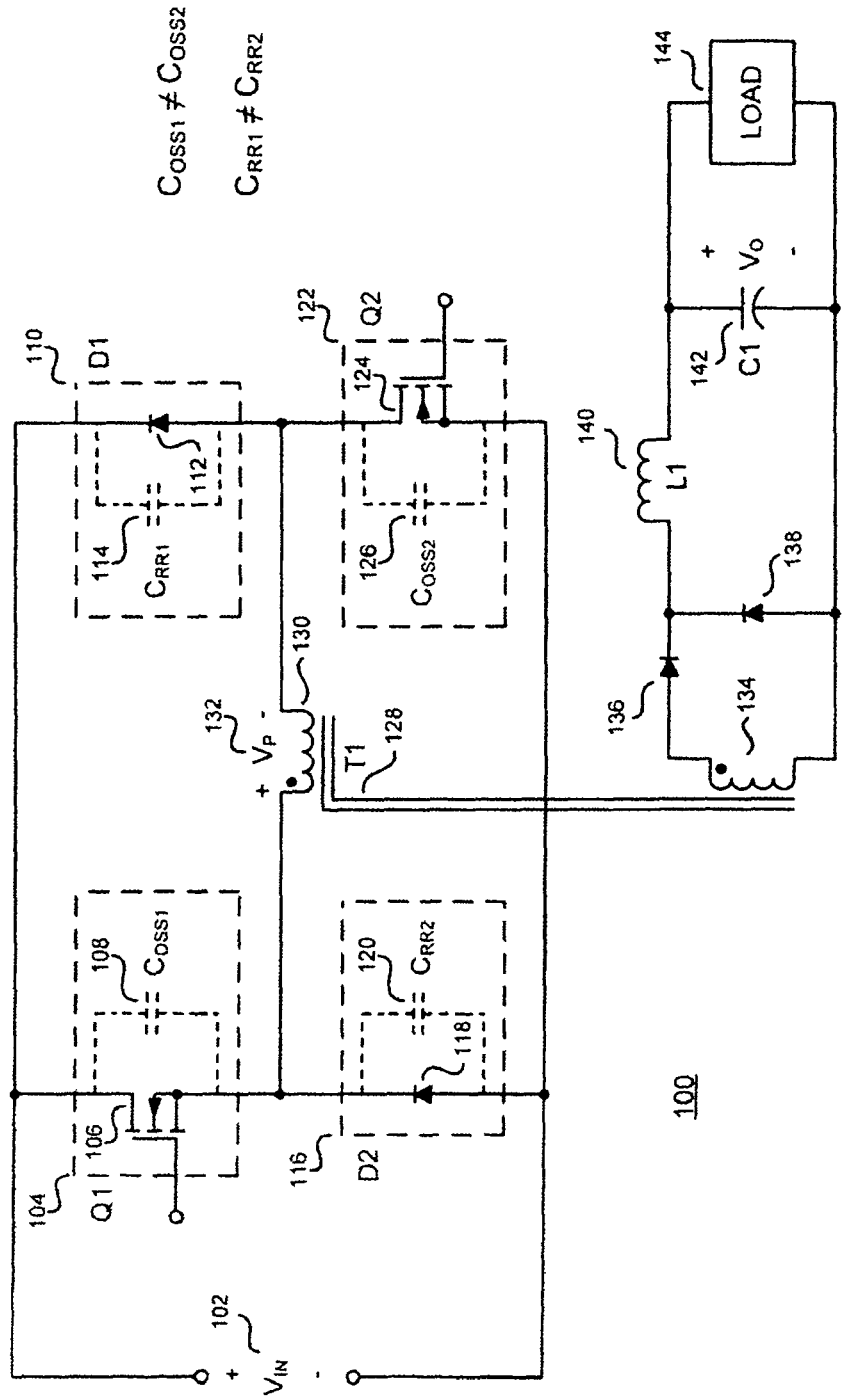
FIG. 1 is a schematic diagram that illustrates salient features of the invention.

FIG. 1 shows one example of a two-switch forward converter 100 in accordance with the teachings of the present invention. The two-switch forward converter uses two active switches, Q1 104 and Q2 122, with two passive switches, D1 110 and D2 116, in a configuration that produces a voltage $V_P$ 132 on a primary winding 130 of a transformer T1 128 from an input voltage $V_{IN}$ 102. A secondary winding 134 of the transformer T1 128 produces a voltage proportional to the primary voltage $V_P$ 132. An output diode 136 rectifies the voltage at the secondary winding 134. A freewheeling diode 138, an output inductor L1 140, and an output capacitor C1 142 filter the rectified voltage from the secondary winding 134 to produce an output voltage $V_O$ 142 at a load 144.

A difference between an active switch and a passive switch is that the active switch receives a control signal that opens and closes the switch, whereas a passive switch does not usually receive a control signal. An open switch does not normally conduct current. A closed switch can conduct current. Active switches typically have one or more control terminals that determine whether or not two other terminals of the active switch may conduct current. The signals that open and close active switches Q1 104 and Q2 122 in FIG. 1 are not shown in the illustration to avoid obscuring teachings in accordance with the present invention.

Passive switches generally have only two terminals. Typically, the voltage between the terminals determines whether a passive switch is open or closed. A diode can be considered a passive switch, since it conducts current when the voltage between its two terminals has one polarity (anode positive with respect to cathode), and it substantially blocks current when the voltage between the terminals has the opposite polarity (anode negative with respect to cathode).

The example of FIG. 1 shows the active switches Q1 104 and Q2 122 comprise metal oxide field effect transistors (MOSFETs) 106 and 124 respectively, with their respective inherent output capacitances depicted as capacitors $C_{OSS1}$ 108 and $C_{OSS2}$ 126, respectively. Capacitors $C_{OSS1}$ 108 and $C_{OSS2}$ 126 are shown with broken lines in FIG. 1 to emphasize that they represent an inherent behavior of the MOSFETs 106 and 124, and that they are not external components. Control signals turn on MOSFETs 106 and 124 to close active switches Q1 104 and Q2 122. Control signals turn off MOSFETs 106 and 126 to open active switches Q1 104 and Q2 122.

In other examples, the respective active switches Q1 104 and Q2 122 may be realized with other suitable electronic devices such as bipolar junction transistors (BJTs) or insulated gate bipolar transistors (IGBTs). The output capacitance of MOSFETs and other active switching devices is significant, as explained below. The switches can be integrated using a single substrate or provided as discrete components.

The example of FIG. 1 also shows the passive switches D1 110 and D2 116 comprise PN junction diodes 112 and 118 respectively, having reverse recovery characteristics that are modeled by reverse recovery capacitances depicted as capacitors $C_{RR1}$ 114 and $C_{RR2}$ 120, respectively, with broken lines. The reverse recovery capacitors model a reverse recovery characteristic of real diodes. When the polarity of the voltage on a PN junction diode transitions to change the state of the diode from conducting current to blocking current, there is a momentary reverse current for a time known as the reverse recovery time that occurs while carriers of electric charge are removed from the device. Normally, the reverse recovery capacitance is considered to be present only during the reverse recovery time of the diode.

The reverse recovery time and the reverse current help define the reverse recovery characteristic of the diode. A diode that has a short reverse recovery time is considered to be a fast diode. A diode that has a long reverse recovery time can be known as a slow diode. A fast diode typically has a reverse recovery time substantially less than one microsecond. A slow diode typically has a reverse recovery time substantially greater than one microsecond. The reverse recovery characteristic of the passive switches D1 110 and D2 116 are explained in further detail below.

In one example, the MOSFETs 106 and 124 of respective active switches Q1 104 and Q2 122 are either both switched on or are both switched off in response to their respective control signals. Diodes 112 and 118 in the passive switches D1 110 and D2 116, respectively, turn on and off in response to the voltages that result from the switching of the active switches Q1 104 and Q2 122.

Conventional designs of two-switch forward converters typically use nominally identical active switches and nominally identical passive switches to reduce the number of distinct parts required in the design. A reduction in the number of distinct components often results in reduced cost. As discussed in the examples below, however, the use of devices with substantially different characteristics for the two active switches and the use of devices with substantially different characteristics for the two passive switches can produce a lower cost design.

For example, the availability of low-cost power integrated circuits that include high voltage MOSFET transistors having control functions allow the use of such devices to provide one of the active switches in the two-switch forward converter. The other active switch in the converter can be a discrete electronic device that can differ in many ways from the MOSFET in the integrated circuit.

A parameter that is typically considered when selecting a switching device is the output capacitance of the device. The device dissipates the energy stored in its output capacitance every time the device turns on. The energy dissipated is proportional to the square of the voltage present in the capacitance when the device turns on. Dissipation of energy normally raises the temperature of the device. A larger package or a heat sink may be required to prevent excessive rise in temperature that could damage the device. Thus, the added cost of thermal management can offset the advantage of the low-cost power integrated circuit. Therefore, switching devices that typically have small output capacitances are used and are typically switched when the voltage on the capacitance is low.

In applications where one of the active switches is a MOSFET in an integrated circuit and the other active switch is packaged as a discrete component, the discrete component often has an on-resistance that is substantially lower than the on-resistance of the MOSFET in the integrated circuit. A low on-resistance is desirable to reduce conduction loss in the device. Output capacitance usually increases as on resistance is reduced. Consequently, the selected switching device packaged as a discrete component often has an output capacitance that is much greater than the output capacitance of the MOSFET in the integrated circuit. In accordance with the present disclosure, a two-switch forward converter that reduces excessive dissipation of energy when the active switches have substantially different output capacitance is described. The asymmetric switch forward converter uses asymmetric passive switches to reduce the voltage that remains across the active switch that has the higher output capacitance before the active switches turn on. The energy in the output capacitance is dissipated in the switch when the switch turns on. Thus, reducing the energy in the capacitance reduces the dissipation of energy in the active switch that has the higher output capacitance.

Figure 2:
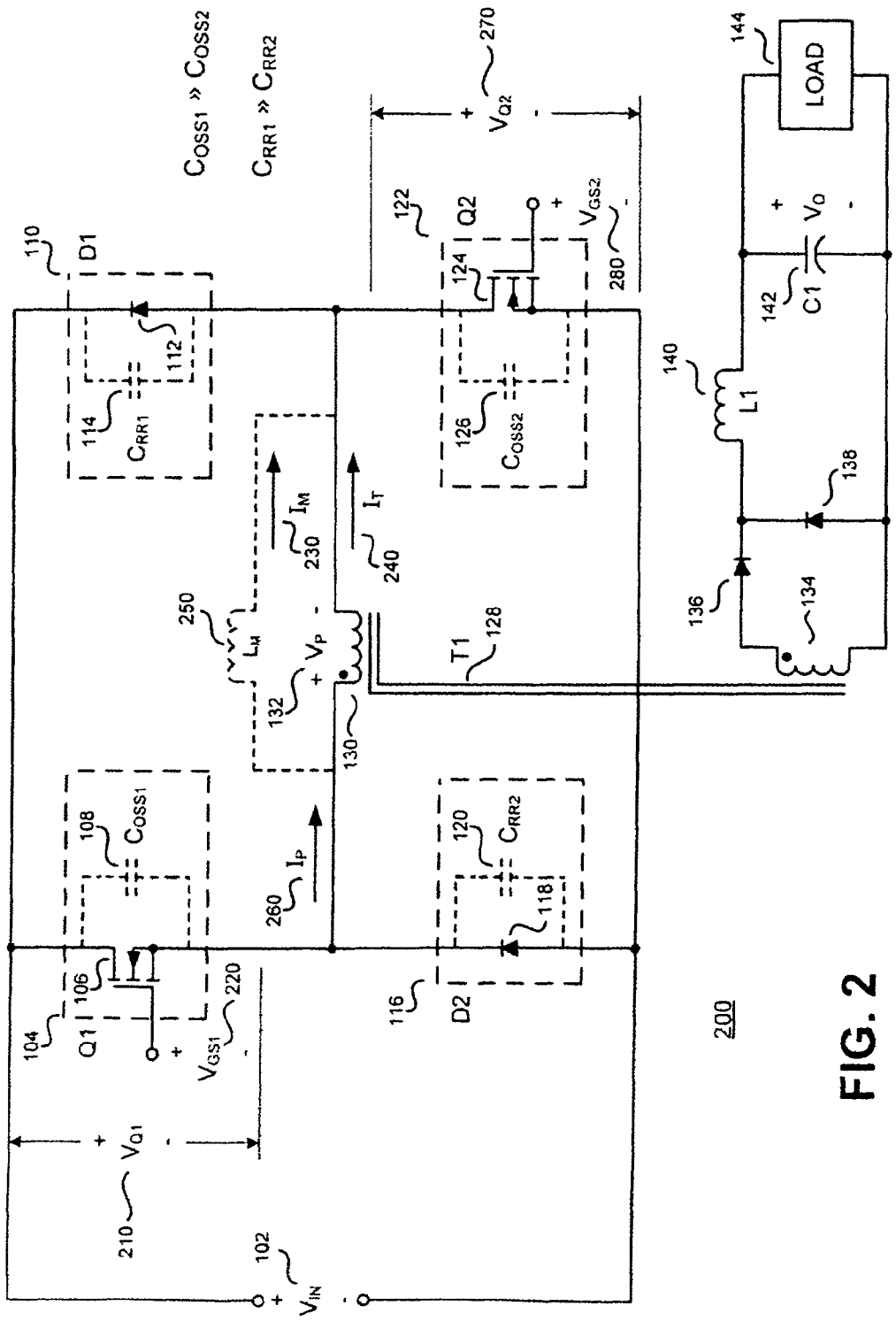
FIG. 2 is a schematic diagram of the invention in FIG. 1 that identifies particular currents and voltages to illustrate the operation.

The example asymmetric two-switch forward converter 100 illustrated in FIG. 1 is shown in greater detail in the schematic diagram 200 of FIG. 2. FIG. 2 illustrates that the output capacitance $C_{OSS1}$ 108 of active switch Q1 104 is substantially greater than the output capacitance $C_{OSS2}$ 126 of active switch Q2 122. In one example, the output capacitance $C_{OSS1}$ 108 of active switch Q1 104 that is a discrete transistor is approximately 330 picofarads, whereas the output capacitance $C_{OSS2}$ 126 of active switch Q2 122 that is included in a power integrated circuit is approximately 50 picofarads.

In the examples of FIG. 1 and FIG. 2, power dissipation in the active switches is managed by selecting operating characteristics of the passive switches D1 110 and D2 116 such that the reverse recovery time of passive switch D1 (modeled by the reverse recovery capacitance $C_{RR1}$) is substantially greater than the reverse recovery time of passive switch D2 (modeled by the reverse recovery capacitance $C_{RR2}$). In one example, the reverse recovery time of passive switch D1 110 is approximately 2 microseconds, whereas the reverse recovery time of passive switch D2 116 is approximately 75 nanoseconds. In the common terminology of the art, D1 110 is a slow diode and D2 116 is a fast diode.

In FIG. 1 and FIG. 2, Q1 104 is a high-side active switch because one of its terminals is common with the positive terminal of the input voltage 102. Conversely, Q2 122 is a low-side active switch because one of its terminals is common with the negative terminal of the input voltage 102. Similarly, D1 110 is a high-side passive switch and D2 116 is a low-side passive switch.

In general, the asymmetric two-switch forward converter has one active switch that has a large output capacitance and one active switch that has a low output capacitance. The active switch with the large output capacitance may either be a high-side switch or a low-side switch. The asymmetric two-switch forward converter also has one passive switch that is a fast diode and one passive switch that is a slow diode.

An asymmetric two-switch forward converter that has a high-side active switch with a high output capacitance and a low-side active switch with a low output capacitance also has a high-side passive switch that is a slow diode and a low-side passive switch that is a fast diode. An asymmetric two-switch forward converter that has a high-side active switch with a low output capacitance and a low-side active switch with a high output capacitance also has a high-side passive switch that is a fast diode and a low-side passive switch that is a slow diode.

FIG. 2 illustrates a voltage $V_{Q1}$ 210 across the high-side active switch Q1 104, and a voltage $V_{Q2}$ 270 across the low-side active switch Q2 122. FIG. 2 also illustrates a control voltage $V_{GS1}$ 220 for the high-side active switch Q1 104, and a control voltage $V_{GS2}$ 280 for the low-side active switch Q2 122. Also depicted with broken lines in FIG. 2 is the magnetizing inductance $L_M$ 250 that is an inherent property of the transformer T1 128.

The magnetizing inductance $L_M$ 250 is used to understand the behavior of the asymmetric two-switch forward converter. The magnetizing inductance $L_M$ represents a non-ideal property of the transformer T1 128. FIG. 2 illustrates a primary current $I_P$ 260 that is the sum of a transformer current $I_T$ 240 and a magnetizing current $I_M$ 230. The transformer current $I_T$ 240 is a portion of the primary current $I_P$ 260 that is scaled by the turns ratio of the transformer and delivered to the secondary winding 134. The magnetizing current $I_M$ 230 is a portion of the primary current $I_P$ 260 that produces the magnetic flux used to couple the primary winding 130 to the secondary winding 134.

The rate of change of the magnetizing current can be determined by the primary voltage $V_P$ 132 and by the magnetizing inductance $L_M$ 250, independent of the transformer current $I_T$ 240. The magnetizing current $I_M$ 230 in the magnetizing inductance $L_M$ 250 represents energy stored in the transformer T1 128. The asymmetric two-switch forward converter uses energy from the magnetizing inductance $L_M$ 250 to reduce the energy dissipated in an active switch, as explained below.

Figure 3:
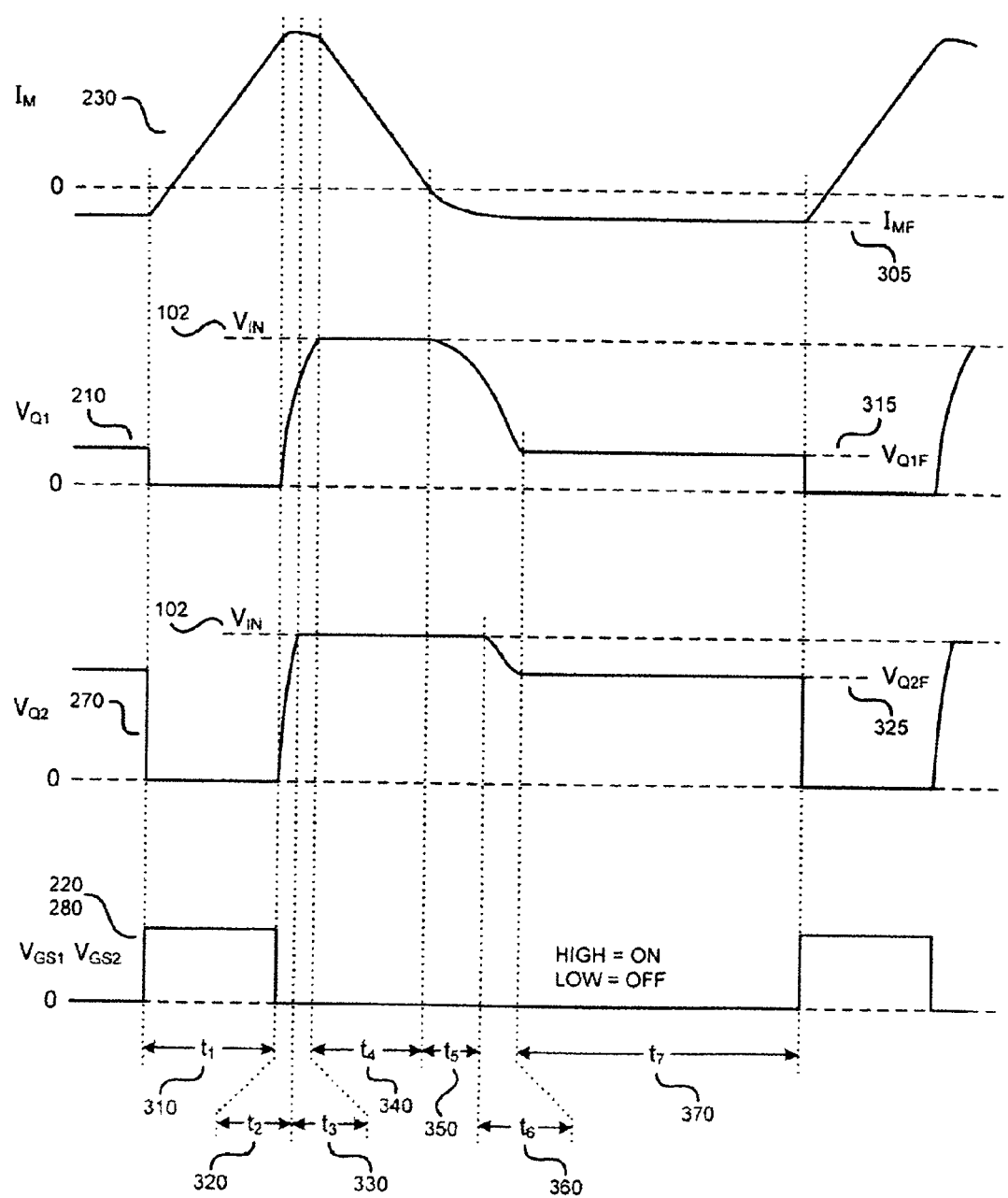
FIG. 3 illustrates waveforms relevant to the operation of the invention.

FIG. 3 illustrates waveforms from the example asymmetric two-switch forward converter of FIG. 2 when operating in the continuous conduction mode. In the continuous conduction mode, the current in the freewheeling diode 138 does not go to zero during the time when the active switches Q1 104 and Q2 122 are open. Continuous conduction mode occurs typically at high output power when components are operating at their highest temperatures.

FIG. 3 illustrates seven distinct intervals in one switching cycle, beginning with interval $t_1$ 310 and ending after interval $t_7$ 370. The MOSFETs 106 and 124 are on during the interval $t_1$. The MOSFETs 106 and 124 are off during the remainder of the switching cycle.

Passive switches D1 110 and D2 116 conduct in response to the voltages across them. The use of a slow diode for the passive switch D1 110 and a fast diode for the passive switch D2 116 permits the voltage $V_{Q1}$ 210 across active switch Q1 104 to be reduced from a maximum of $V_{IN}$ 102 to a final value $V_{Q1F}$ 315 at the end of interval $t_7$ 370. In an ordinary two-switch forward converter that uses identical active switches, the final voltage $V_{Q1F}$ 315 would remain at substantially the full value of $V_{IN}$ 102.

The voltage on active switch Q2 122 at the end of interval $t_7$ 370 is the final value $V_{Q2F}$ 325. The final value $V_{Q2F}$ 325 is the difference between the input voltage $V_{IN}$ 102 and the final voltage $V_{Q1F}$ 315. The final voltage $V_{Q1F}$ 315 is normally minimized as much as possible because the voltage $V_{Q1F}$ 315 determines the energy in the large output capacitance $C_{OSS1}$ 108 that will be dissipated in the MOSFET 106 when the active switches turn on again. The final voltage $V_{Q2F}$ 325 on active switch Q2 122 can be high without causing much difficulty because the output capacitance $C_{OSS2}$ 126 of Q2 122 is much less than the output capacitance $C_{OSS1}$ 108 of Q1 104. The small output capacitance of active switch Q2 122 is normally unable to store enough energy to dominate the heating of active switch Q2 122. Therefore, reduction of the voltage $V_{Q1F}$ 315 to zero at the expense of increasing the voltage $V_{Q2F}$ to the maximum of $V_{IN}$ 102 is usually acceptable. The output capacitance of $C_{OSS1}$ 108 is substantially greater than the output capacitance of $C_{OSS2}$ 126. The net reduction in energy dissipated from $C_{OSS1}$ 108 and $C_{OSS2}$ 126 saves power, reduces cooling requirements, and raises the efficiency of the power supply.

The operation of the asymmetric forward converter can be understood from examination of the current in the transformer T1 128. FIGS. 4A through 4F show simplified portions of the circuit of FIG. 2 to illustrate the path of current during the seven time intervals illustrated in FIG. 3. Some circuit elements that are not used in the explanation do not appear in the illustrations.

Figure 4A:
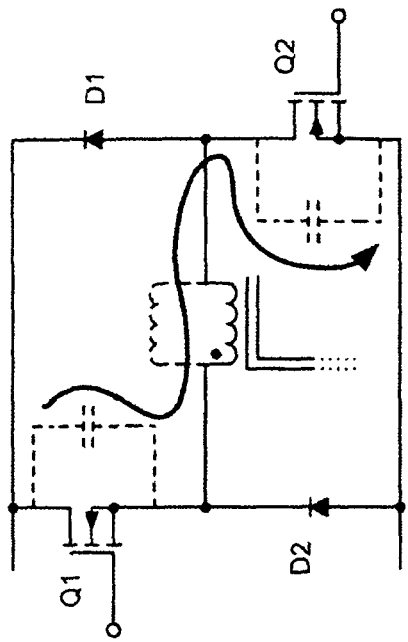
FIG. 4A, FIG. 4B, FIG. 4C, FIG. 4D, FIG. 4E, FIG. 4F, and FIG. 4G are circuit diagrams that illustrate the paths of currents associated with the time intervals identified in FIG. 3.

FIG. 4A shows the path of primary current $I_P$ 260 through the active switches Q1 104 and Q2 122 during the time interval $t_1$ 310. The output capacitances of the active switches and the reverse recovery capacitances of the passive switches are not shown in the drawing since they do not substantially influence the primary current $I_P$ 260 during the interval $t_1$ 310. During the interval $t_1$ 310, active switches Q1 104 and Q2 122 are closed to apply the input voltage $V_{IN}$ 102 to the primary winding 130 of the transformer T1 128 so that $V_P = V_{IN}$, ignoring small voltage drops across the switches Q1 104 and Q2 122. Magnetizing current $I_M$ 230 increases with a linear slope in the magnetizing inductance $L_M$ 250. Passive switches D1 110 and D2 116 are open. Primary current $I_P$ 260 includes the transformer current $I_T$ 240 and the magnetizing current $I_M$ 230.

Figure 4B:
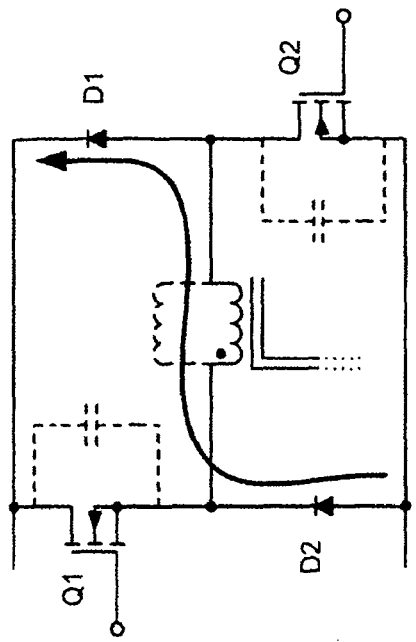

FIG. 4B shows the path of primary current $I_P$ 260 through the active switches Q1 104 and Q2 122 during the time interval $t_2$ 320. When the MOSFETs 106 and 124 turn off at the end of time interval $t_1$ 310, magnetizing current $I_M$ 230 continues as it charges the output capacitances $C_{OSS1}$ 108 and $C_{OSS2}$ 126. The slope of the magnetizing current $I_M$ 230 changes as the voltage $V_P$ 132 across the magnetizing inductance decreases. The time interval $t_2$ 320 ends when the output capacitance $C_{OSS2}$ 126 of active switch Q2 122 charges to the input voltage $V_{IN}$ 102.

Figure 4C:
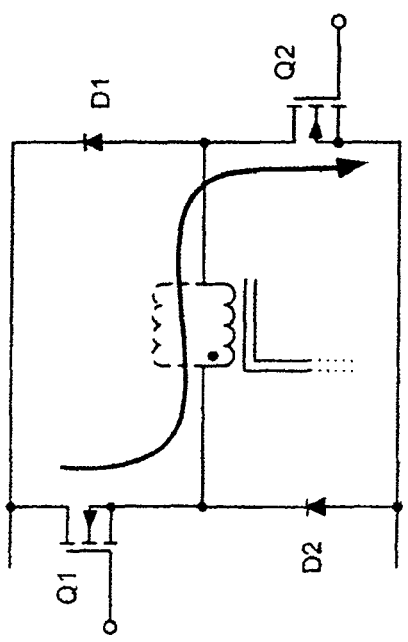

FIG. 4C shows the path of primary current $I_P$ 260 during the time interval $t_3$ 330. In time interval $t_3$ 330, passive switch D1 110 closes to conduct magnetizing current $I_M$ 230. Magnetizing current $I_M$ 230 continues to charge output capacitance $C_{OSS1}$ 108 until the voltage $V_{Q1}$ 210 across active switch Q1 104 reaches the input voltage $V_{IN}$ 102 at the end of time interval $t_3$ 330.

Figure 4D:
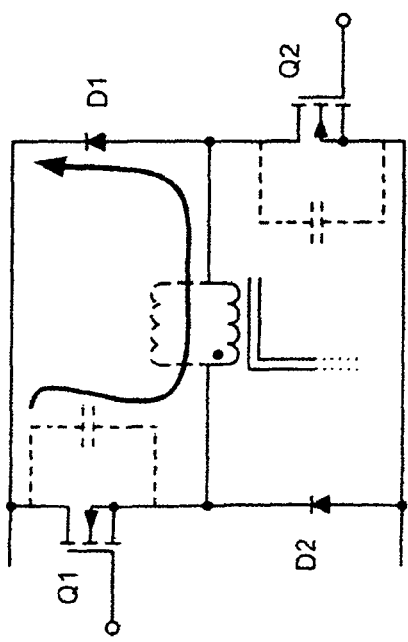

FIG. 4D shows the path of primary current $I_P$ 260 during the time interval $t_4$ 340. In time interval $t_4$ 340, passive switches D1 110 and D2 116 are closed to conduct magnetizing current $I_M$ 230. Magnetizing current $I_M$ 230 decreases with a linear slope that is the result of the input voltage $V_{IN}$ 120 across the magnetizing inductance $L_M$ 250 at the primary of the transformer T1 128 in the opposite polarity from the application of the input voltage in FIG. 4A. The magnetizing current $I_M$ 230 decreases until it reaches zero at the end of time interval $t_4$ 340. At the end of time interval $t_4$ 340, the output capacitances $C_{OSS1}$ 108 and $C_{OSS2}$ 128 are charged to the input voltage $V_{IN}$ 102.

Passive switch D2 116 stops conducting. Its fast recovery allows the current in passive switch D2 116 to fall quickly to zero. The magnetizing current $I_M$ 230 passes through zero and becomes negative to mark the beginning of time interval $t_5$ 350. FIG. 4E shows the path of primary current $I_P$ 260 during the interval $t_5$ 350. During the interval $t_5$ 350, output capacitance $C_{OSS1}$ 108 of active switch Q1 104 discharges through the reverse recovery capacitance $C_{RR1}$ 114 of passive switch D1 110 to increase the magnetizing current $I_M$ 230 in the negative direction. The reverse recovery capacitance $C_{RR1}$ 114 conducts the magnetizing current $I_M$ 230 until the reverse recovery charge is removed from passive switch D1 110 at the end of the reverse recovery time of passive switch D1 110. The time interval $t_5$ 350 ends when the passive switch D1 110 stops conducting in the reverse direction.

When the passive switch D1 110 stops conducting in the reverse direction at the end of time interval $t_5$ 350, the magnetizing current $I_M$ 230 begins to discharge the output capacitance $C_{OSS2}$ 126 of active switch Q2 122 at the start of time interval $t_6$ 360. FIG. 4F shows the path of primary current $I_P$ 260 during the interval $t_6$ 360. The magnetizing current $I_M$ 230 reduces the voltages $V_{Q1}$ 210 and $V_{Q2}$ 270 until their sum reaches the value of $V_{IN}$ 102 and the negative magnetizing current $I_M$ 230 reaches a final value $I_{MF}$ 305. When the sum of $V_{Q1}$ 210 and $V_{Q2}$ 270 is the value $V_{IN}$ 102, the primary voltage $V_P$ 132 is zero, and the time period $t_6$ 360 ends.

When the primary voltage $V_P$ 132 reaches zero at the end of time interval $t_6$ 360, the voltage on the secondary winding 134 also goes to zero thereby allowing output diode 136 to conduct. In the continuous conduction mode, freewheeling diode 138 conducts from the end of time interval $t_1$ 310 until the end of time interval $t_7$ 370.

Figure 4G:
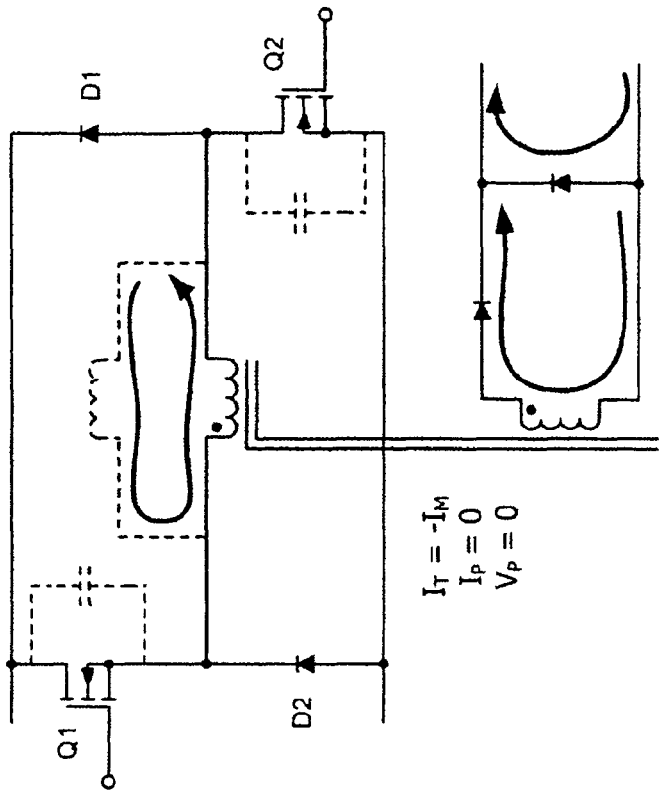
Figure 4E:
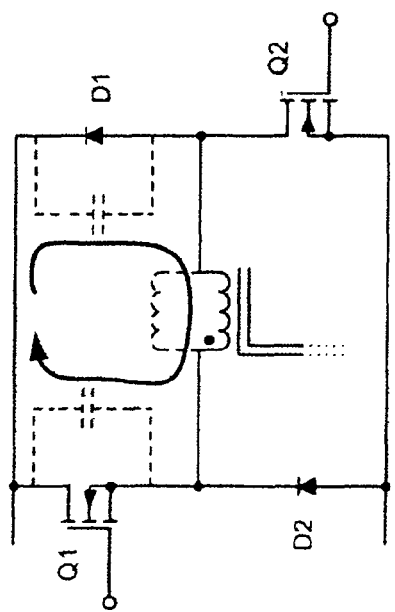
Figure 4F:
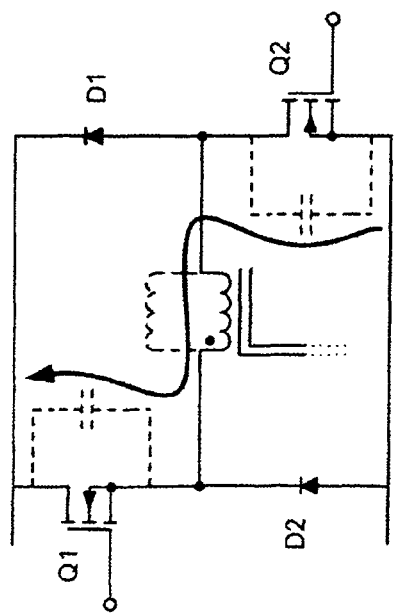

FIG. 4G shows the paths of currents during the time interval $t_7$ 370. The condition of zero voltage on both the primary winding 130 and the secondary winding 134 of the transformer T1 128 allows the magnetizing current $I_M$ 230 to circulate in the primary winding 130. The primary current $I_P$ 260 goes to zero when the magnetizing current $I_M$ 230 becomes negative transformer current $I_T$ 240. The transformer current $I_T$ 240 produces a current scaled by the turns ratio of the transformer in the secondary winding 134.

Figure 5:
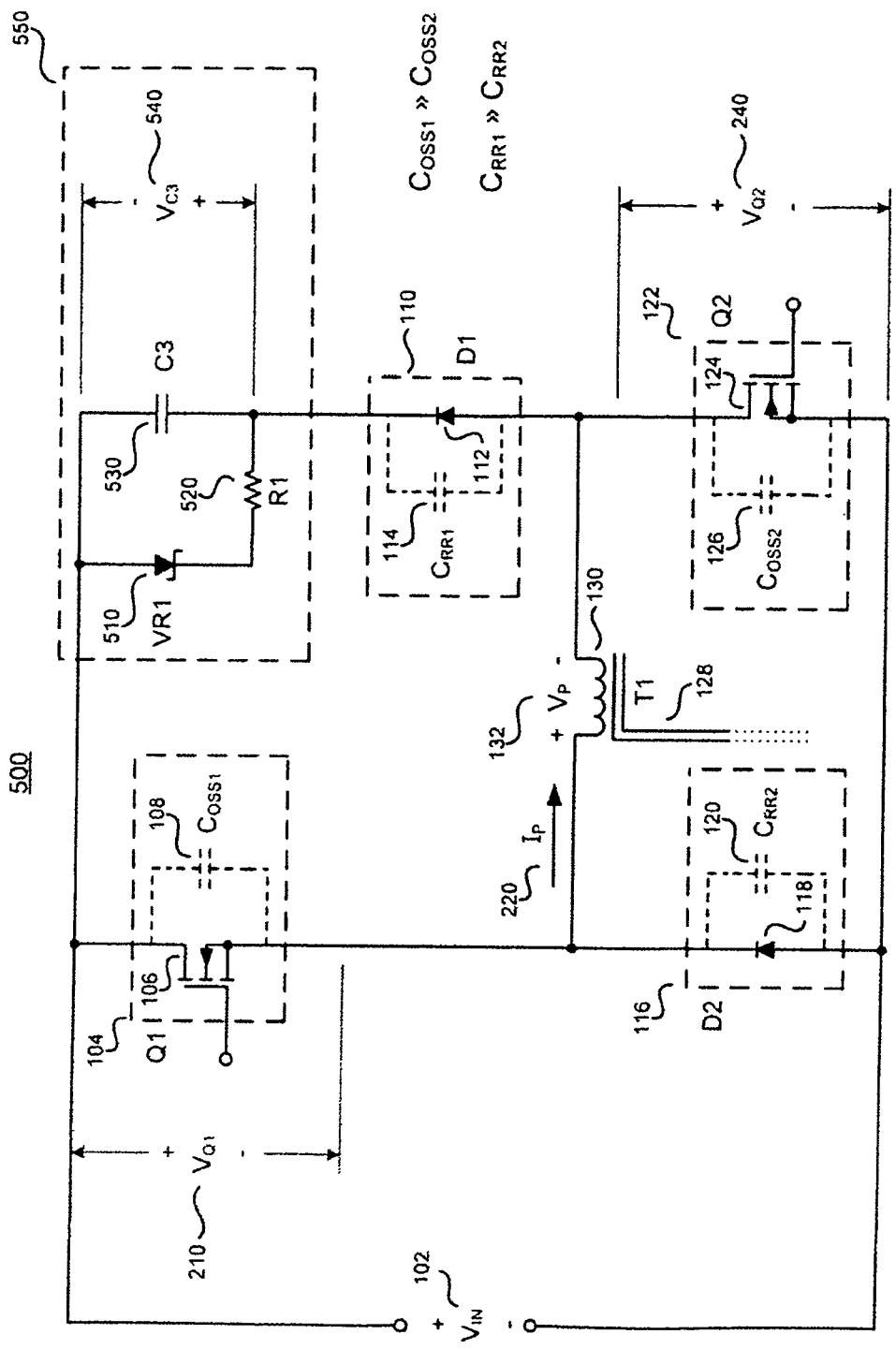
FIG. 5 illustrates one example of the invention that includes a circuit that extends the maximum duty ratio of the two-switch forward converter.

The asymmetric two-switch forward converter may also include modifications that have been applied to conventional two-switch forward converters. A conventional two-switch forward converter has a maximum duty ratio of 50%. That is, the active switches cannot be closed for more than half the time in a complete switching period for repetitive switching cycles. FIG. 5 shows one example 500 of an asymmetric two-switch forward converter that includes transformer recovery circuit 550 that receives the current from the high-side passive switch D1 110.

The example transformer recovery circuit 550 includes a Zener diode VR1 510, a resistor R1 520, and a capacitor C3 530. The current from the high-side passive switch D1 110 establishes a voltage $V_{C3}$ 540 on capacitor C3 530 between the positive terminal of the input voltage $V_{IN}$ 102 and the high-side passive switch D1 110.

The voltage $V_{C3}$ 540 adds to the input voltage $V_{IN}$ 102 to reduce the time required for the magnetizing current $I_M$ 230 to decrease to zero in the interval $t_4$ 340. The reduction in time for the magnetizing current $I_M$ 230 to return to zero has the advantage of, for example, increasing the maximum time allowed for the interval $t_1$ 310 in a switching cycle, thereby allowing the range of control for the two-switch forward converter beyond the limitation of 50% duty ratio to be extended. The extended range of control allows the converter to provide a desired output for a wider range of input voltage $V_{IN}$ 102. In an example that does not extend the range of input voltage $V_{IN}$ 102, a larger duty ratio allows lower RMS (root-mean-square) currents in the active switches Q1 104 and Q2 122, thereby reducing conduction losses. Another added benefit can be that the voltage $V_{C3}$ 540 helps to discharge the output capacitance $C_{OSS1}$ during time intervals $t_5$ 350 and $t_6$ 360, which reduces the final voltage $V_{Q1F}$ 315 on the high-side active switch Q1 210.

Figure 6:
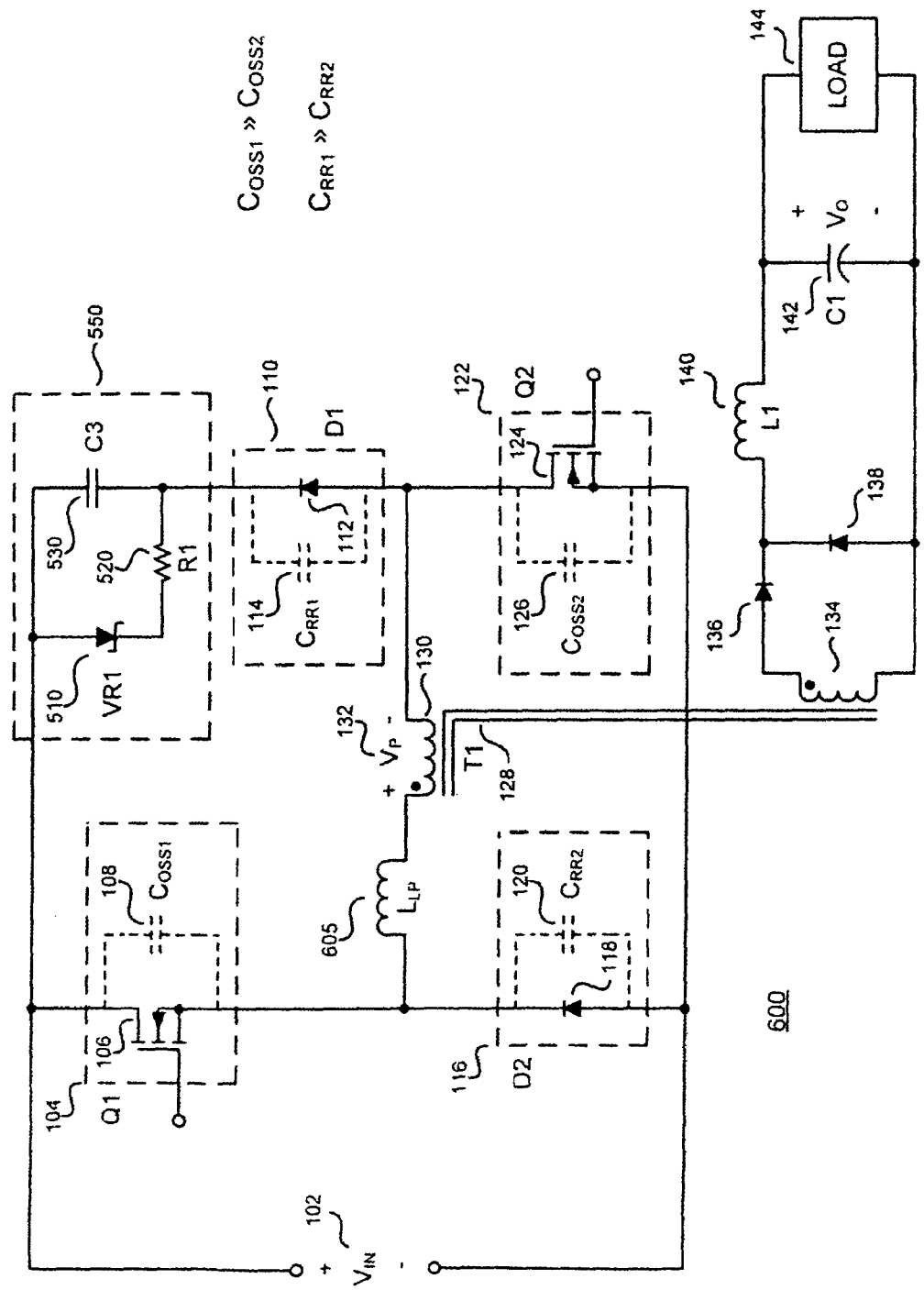
FIG. 6 illustrates another example of the invention that includes a primary inductance in addition to a circuit to extend the maximum duty ratio of the two-switch forward converter beyond 50 percent.

FIG. 6 shows another example 600 of an asymmetric two-switch forward converter that adds a primary leakage inductance $L_{LP}$ 605 to one end of the primary winding 130 of the transformer T1 128. The primary leakage inductance $L_{LP}$ 605 in FIG. 6 represents an inherent property of the transformer T1 that may be augmented by a discrete inductor.

The primary leakage inductance $L_{LP}$ 605 stores energy from the primary current $I_P$ 260. Energy from the primary leakage inductance $L_{LP}$ 605 helps the magnetizing inductance $L_M$ 250 to charge the capacitor C3 530 during time intervals $t_3$ 330 and $t_4$ 340. The resulting higher voltage on the capacitor C3 530 extends the recovery time of the passive switch D1 110. Thus, energy from the primary inductance $L_{LP}$ 605 also helps the magnetizing inductance $L_M$ 250 to discharge the output capacitance $C_{OSS1}$ during time intervals $t_5$ 350 and $t_6$ 360.

The above description of illustrated examples of the present invention, including what is described in the Abstract, are not intended to be exhaustive or to be limiting as to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A switching circuit for use in a power supply, comprising:
   a first active switch coupled to a first terminal of a primary winding of a transformer;
   a second active switch coupled to a second terminal of the primary winding of the transformer, wherein an output capacitance of the first active switch is greater than an output capacitance of the second active switch;
   a first passive switch coupled to the second active switch and to the second terminal of the primary winding;
   a second passive switch coupled to the first active switch and to the first terminal of the primary winding, wherein a reverse recovery time of the first passive switch is greater than a reverse recovery time of the second passive switch; and
   a recovery circuit coupled to receive a current from the first passive switch.

2. The switching circuit of claim 1 wherein the first active switch is a high-side switch.

3. The switching circuit of claim 2 wherein the first passive switch is a high-side switch.

4. The switching circuit of claim 1 wherein at least one of the first and second active switches is a metal oxide semiconductor field effect transistor.

5. The switching circuit of claim 1 wherein at least one of the first and second passive switches is a PN junction diode.

6. The switching circuit of claim 1 further comprising a capacitor included in the transformer recovery circuit to establish a voltage while receiving the current from the first passive switch.

7. The switching circuit of claim 1 wherein the first and second active switches are opened and closed using an active duty ratio of over 50 percent.

* * * * *